(12) United States Patent
Kocic

(10) Patent No.: US 11,085,751 B2
(45) Date of Patent: Aug. 10, 2021

(54) ERGONOMIC MOBILE CONTROLLER FOR COORDINATE MEASURING MACHINE

(71) Applicant: Hexagon Metrology, Inc., North Kingstown, RI (US)

(72) Inventor: Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

(21) Appl. No.: 16/679,987

(22) Filed: Nov. 11, 2019

(65) Prior Publication Data

US 2021/0140752 A1    May 13, 2021

(51) Int. Cl.
*G01B 5/00*  (2006.01)
*G01B 5/008* (2006.01)

(52) U.S. Cl.
CPC ........... *G01B 5/0002* (2013.01); *G01B 5/008* (2013.01)

(58) Field of Classification Search
CPC ....... G01B 5/0002; G01B 5/008; G01B 7/008
USPC .......................................................... 33/503
See application file for complete search history.

(56) References Cited

U.S. PATENT DOCUMENTS

| | | | | |
|---|---|---|---|---|
| 6,158,136 A * | 12/2000 | Gotz | ...................... | G01B 3/008 33/503 |
| 7,392,692 B2 * | 7/2008 | Noda | ...................... | G01B 5/008 33/503 |
| 7,599,813 B2 * | 10/2009 | Grupp | .................. | G01B 21/042 33/1 M |
| 8,581,855 B2 | 11/2013 | Spink et al. | | |
| 9,329,595 B2 | 5/2016 | Lankalapalli et al. | | |
| 10,086,273 B2 | 10/2018 | Jones et al. | | |
| 2004/0224775 A1 * | 11/2004 | Wood | ...................... | A63F 13/95 463/43 |
| 2011/0146092 A1 * | 6/2011 | Engel | ...................... | G01B 7/012 33/503 |
| 2012/0229662 A1 | 9/2012 | Lankalapalli et al. | | |
| 2012/0322555 A1 * | 12/2012 | Burgess | .................. | A63F 13/06 463/37 |
| 2013/0194190 A1 * | 8/2013 | Lysenko | ............... | G06F 1/1662 345/169 |
| 2015/0133193 A1 * | 5/2015 | Stotler | .................. | G06F 1/1626 455/557 |

(Continued)

FOREIGN PATENT DOCUMENTS

| | | |
|---|---|---|
| EP | 2505959 A1 | 10/2012 |
| EP | 2154472 B1 | 10/2014 |
| EP | 2614415 B1 | 8/2017 |

OTHER PUBLICATIONS

[No Author Listed], Logitech, User Manual, Harmony 1100 Advanced Universal Remote, Version 1.1 (2008). Retrieved from the Internet under www.logitech.com/assets/44642/harmony1100i-user-guide on Feb. 20, 2020. 48 Pages.

(Continued)

*Primary Examiner* — Christopher W Fulton
(74) *Attorney, Agent, or Firm* — Nutter McClennen & Fish LLP

(57) ABSTRACT

Embodiments described herein provide a mobile CMM jogbox that includes one or more ergonomic apparatuses configured and disposed to allow a CMM operator to hold and operate the jogbox, while avoiding or mitigating the fatigue of an operator using the jogbox.

5 Claims, 16 Drawing Sheets

(56) References Cited

U.S. PATENT DOCUMENTS

| | | | |
|---|---|---|---|
| 2015/0363007 A1* | 12/2015 | Lysenko | G06F 1/1671 |
| | | | 345/169 |
| 2016/0010974 A1* | 1/2016 | Bumgardner | G01B 11/007 |
| | | | 33/503 |
| 2016/0076867 A1* | 3/2016 | Ruck | G01B 21/047 |
| | | | 33/503 |
| 2017/0189800 A1 | 7/2017 | Crain | |
| 2018/0133594 A1* | 5/2018 | Guo | A63F 13/245 |
| 2019/0030425 A1 | 1/2019 | Jones et al. | |

OTHER PUBLICATIONS

[No Author Listed) Logitech, Harmony 1100 Support Page. Retrieved from the Internet under http://support.logitech.com/en_us/product/harmony-1100 on Mar. 16, 2018. 8 pages.

[No Author Listed] Hexagon Manufacturing Intelligence, Next Jogbox (NJB). Retrieved from the Internet under www.hexagonmi.com/products/coordinate-measuring-machines/accessories-for-cmms/next-jogbox on Mar. 14, 2018. 4 pages.

[No Author Listed] DEA Brown & Sharpe Hexagon Jogbox for CMM with Renishaw Tesa Warranty. Last updated on Feb. 7, 2017. Retrieved from the Internet under www.ebay.ie/itm/192082678517 on Mar. 14, 2018. 12 pages.

Invitation to Pay Additional Fees for International Patent Application No. PCT/US2020/059703 dated Mar. 4, 2021. 13 pages.

* cited by examiner

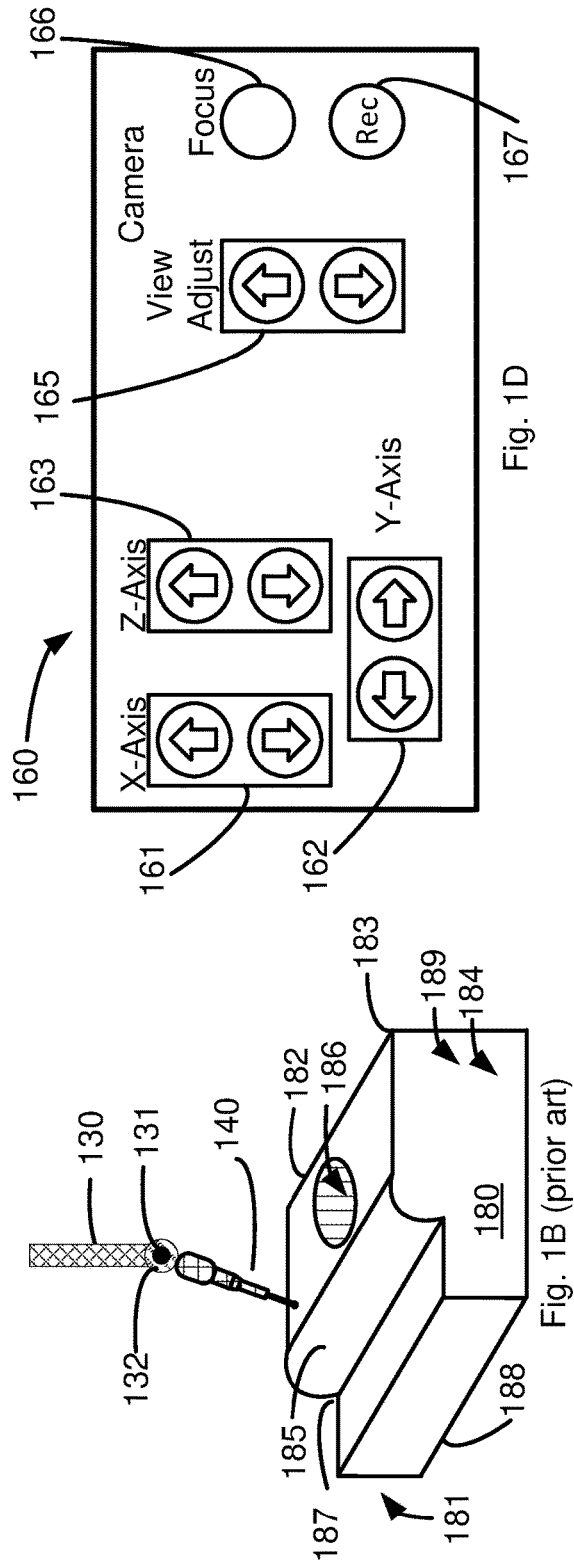

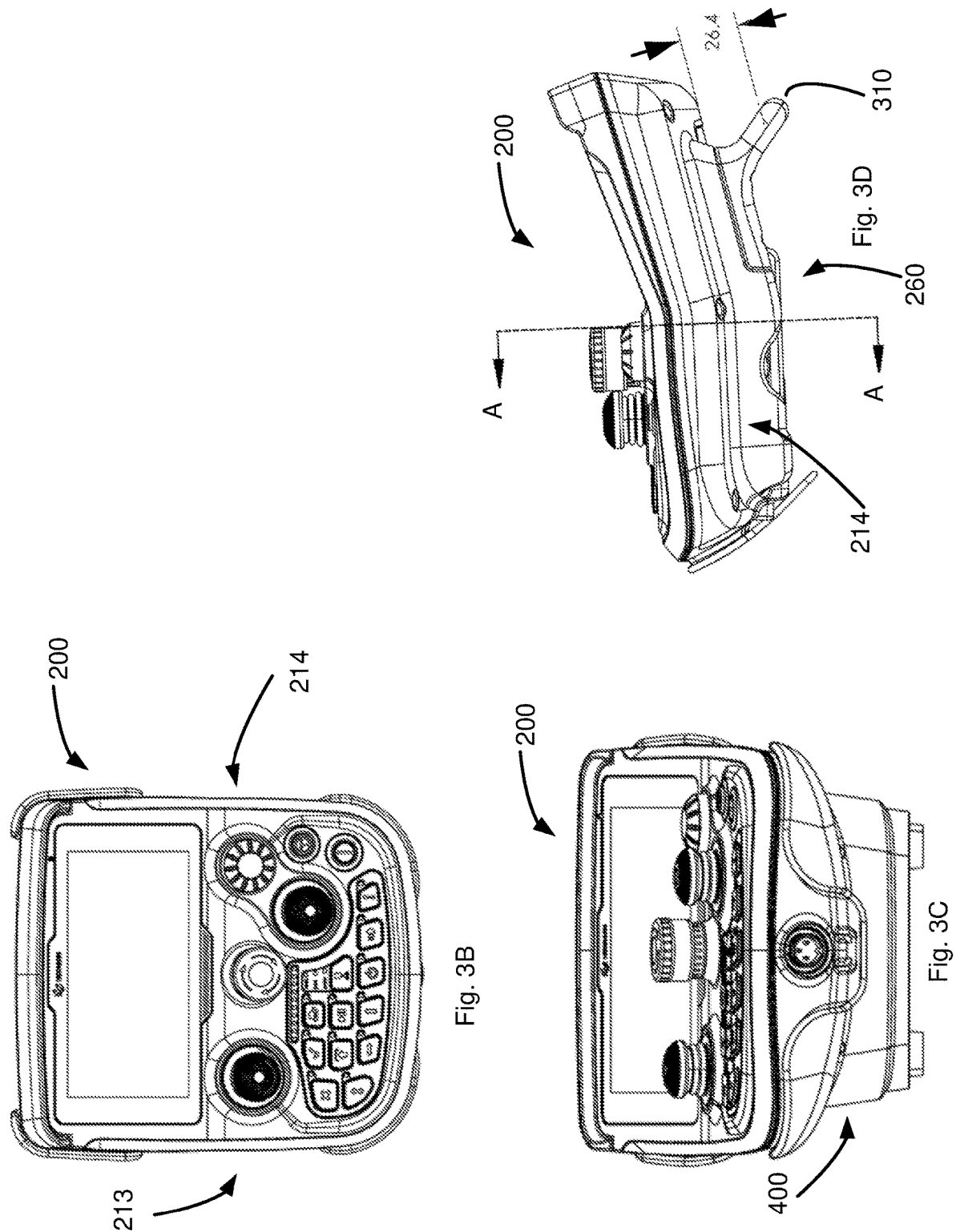

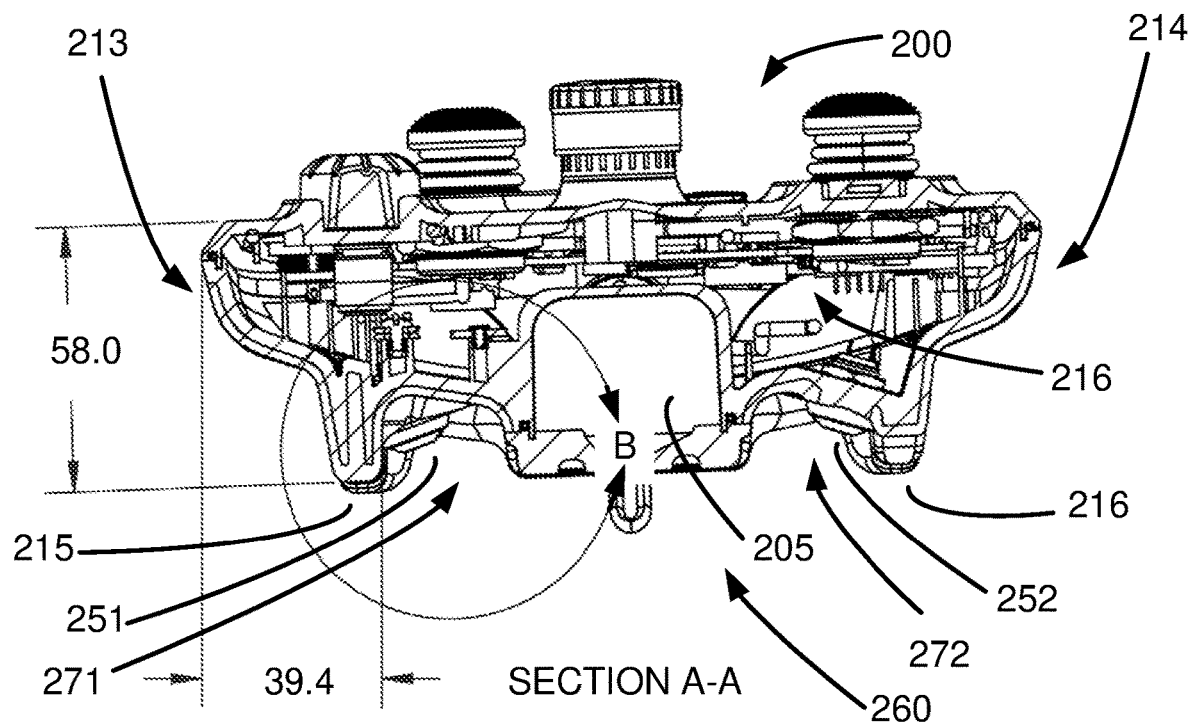
Fig. 3F
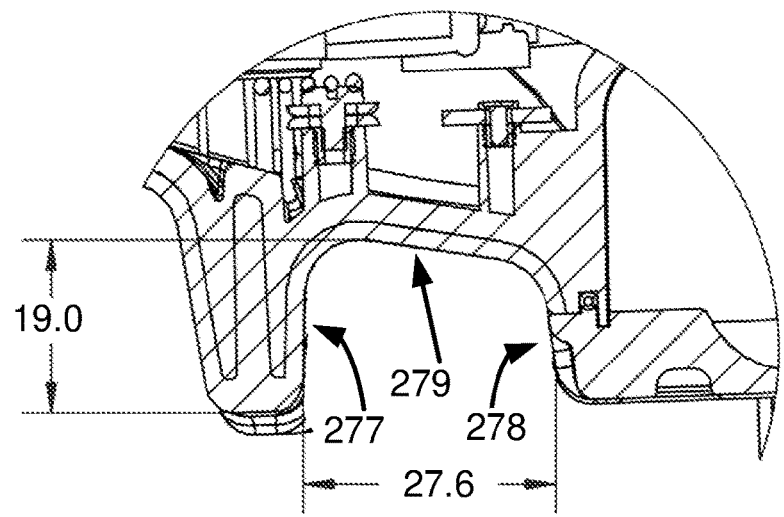
Fig. 3G  DETAIL B

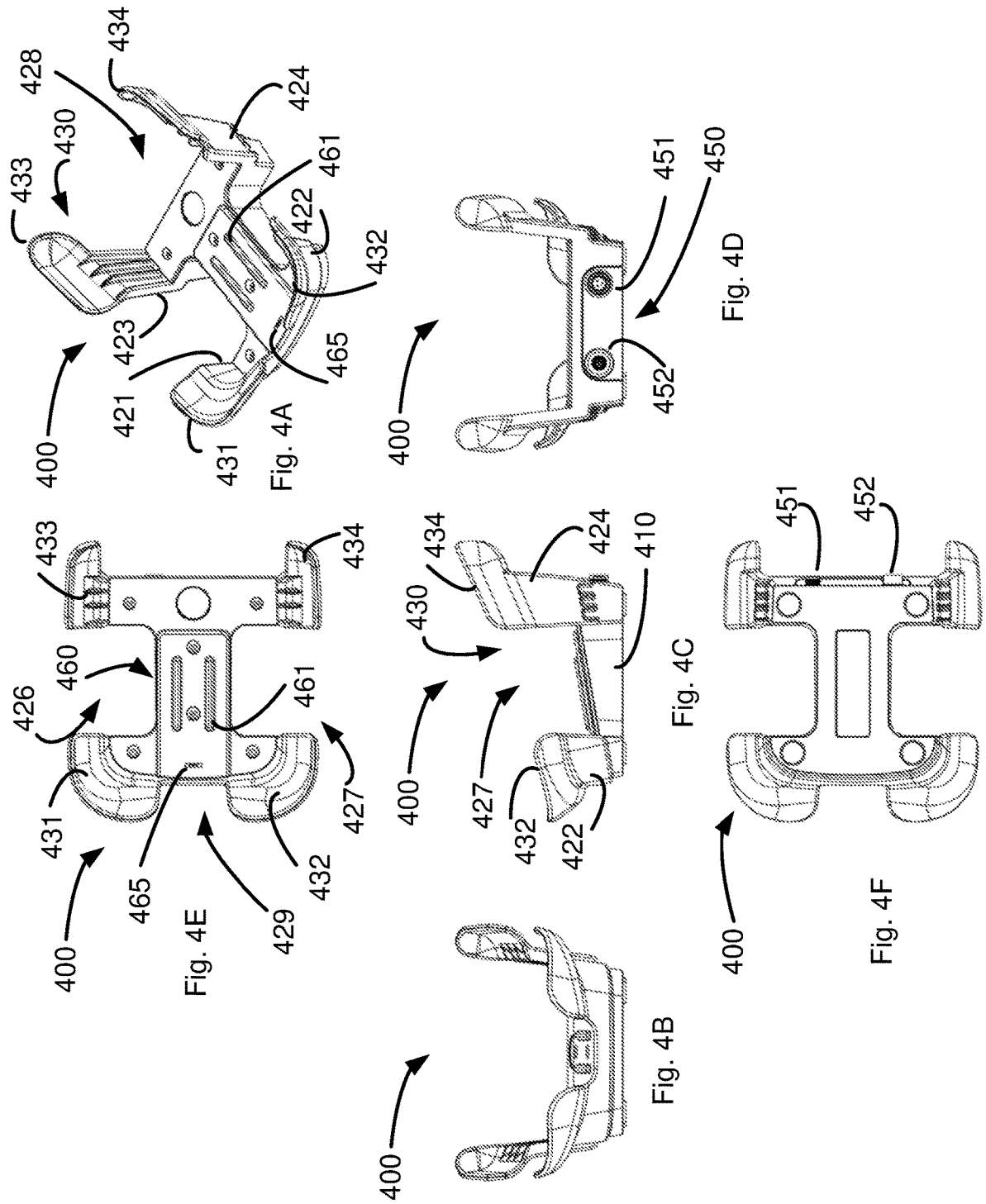

ERGONOMIC MOBILE CONTROLLER FOR COORDINATE MEASURING MACHINE

TECHNICAL FIELD

The present disclosure relates to coordinate measuring machines and, more particularly, to apparatuses for controlling coordinate measuring machines.

BACKGROUND ART

Coordinate measuring machines (CMMs) are used for accurately measuring a wide variety of work pieces. For example, CMMs can measure critical dimensions of aircraft engine components, surgical tools, and gun barrels. Precise and accurate measurements help to ensure that their underlying systems, such as an aircraft in the case of aircraft components, operate as specified. Measurement of surface finish, on the other hand, has historically been beyond the ability of CMMs, and required specialized tools.

SUMMARY OF THE EMBODIMENTS

In accordance with one embodiment, a mobile controller for a coordinate measuring machine includes a housing having a top face, and a backside opposite the top face, and sides extending between the top face and the backside. A plurality of frontside controls are disposed on the top face, such that at least some of the frontside controls are reachable by a thumb of the operator (i.e., a CMM operator) while holding sides of the mobile controller with both hands. In some embodiments, at least one of the frontside controls is not reachable by a thumb of the CMM operator while holding respective sides mobile controller with both hands using the ergonomic apparatus.

The controller also includes an ergonomic apparatus extending from the backside, the ergonomic apparatus configured to enable the operator to hold the mobile controller while mitigating fatigue on hands and fingers of the CMM operator.

In some embodiments, the ergonomic apparatus includes a gripper extending outward from the backside, the gripper shaped and disposed to allow the CMM operator to grasp the gripper and support the mobile controller with a single hand, to enable the CMM operator to manipulate at least one of the frontside controls with one of the CMM operator's other hands. In some embodiments, the gripper is has "T" shape.

In some embodiments, the ergonomic apparatus includes a concave trench extending inward from the surface of the backside, and disposed near an edge of the backside, and shaped to receive three outer fingers of a hand of the CMM operator, enable the CMM operator to simultaneously: grasp the mobile controller and support the mobile controller with a single hand, and manipulate at least one of the frontside controls with another of the CMM operator's hands. Moreover, in other embodiments, the ergonomic apparatus includes a set of concave trenches extending inward from the surface of the backside, each of the trenches disposed near an edge of the backside, each of the concave trenches shaped to receive three outer fingers of a hand of the CMM operator, to enable the CMM operator to simultaneously: grasp the mobile controller and support the mobile controller with a single hand, and manipulate at least one of the frontside controls with another of the CMM operator's hands. For example, in some such embodiments, the set of concave trenches comprises two concave trenches parallel to one another, each of the two concave trenches disposed near two respective edges of the mobile controller.

Any of the foregoing embodiments may include a display screen disposed on or at the top face of the housing so as to present, to the CMM operator, information about the operation of the coordinate measuring machine. In some such embodiments, the display screen is a touchscreen configured to receive, from the CMM operator, control inputs for controlling the coordinate measuring machine.

Any of the foregoing embodiments may also include a backside control disposed on the backside of the mobile controller, the backside control configured to respond to operator manipulation to: (a) in a first state, enable the operator control of a movable feature of the coordinate measuring machine in response to operator manipulation of a frontside control, and (b) in a second state, disable operator control of that movable feature of the coordinate measuring machine in response to operator manipulation of the frontside control. In some such embodiments, the backside control includes a plurality of buttons, and wherein: (i) the backside control is configurable into the first state by the operator pressing at least one of the plurality buttons; and (ii) the backside control is configurable into the second state by the operator releasing all of the plurality of buttons. In some such embodiments, the backside control is configurable into the first state by the operator simultaneously pressing at least two of the plurality of buttons.

Another embodiment is a cradle that includes a base configured to rest on a flat surface; and a nest suspended from the base, the nest configured to receive a jogbox and removably couple the jogbox to the cradle.

Some embodiments of the cradle include a set of sidewalls extending between the base and the cradle, the set of sidewalls suspending the cradle from the base.

Some embodiments of the cradle also include a set of grasping apertures, each grasping aperture configured to receive a hand of an operator to allow fingers to reach a backface of a jogbox in the nest and to lift the jogbox out of the nest. In some such embodiments, at least one grasping aperture of the set of grasping apertures is configured to allow the hand of the operator to reach and activate a backside button of a jogbox while the jogbox is secured in the nest.

Some embodiments of the cradle also include an input electrical interface configured to receive electrical power and communication signals.

Some embodiments of the cradle also an output electrical interface configured to provide electrical power and communication signals to a jogbox secured in the nest.

BRIEF DESCRIPTION OF THE DRAWINGS

The foregoing features of embodiments will be more readily understood by reference to the following detailed description, taken with reference to the accompanying drawings, in which:

FIG. 1B schematically illustrates an embodiment of a workpiece;

FIG. 1C schematically illustrates an embodiment of a control interface;

FIG. 1D schematically illustrates an embodiment of a controller;

FIG. 3A, FIG. 3B, FIG. 3C, FIG. 3D, FIG. 3E, FIG. 3F, FIG. 3G, and FIG. 3H schematically illustrate views and features of another embodiment of a jogbox;

FIG. 4A, FIG. 4B, FIG. 4C, FIG. 4D, FIG. 4E and FIG. 4F schematically illustrate views of an embodiment of a jogbox cradle.

DETAILED DESCRIPTION OF SPECIFIC EMBODIMENTS

Figure 1A:
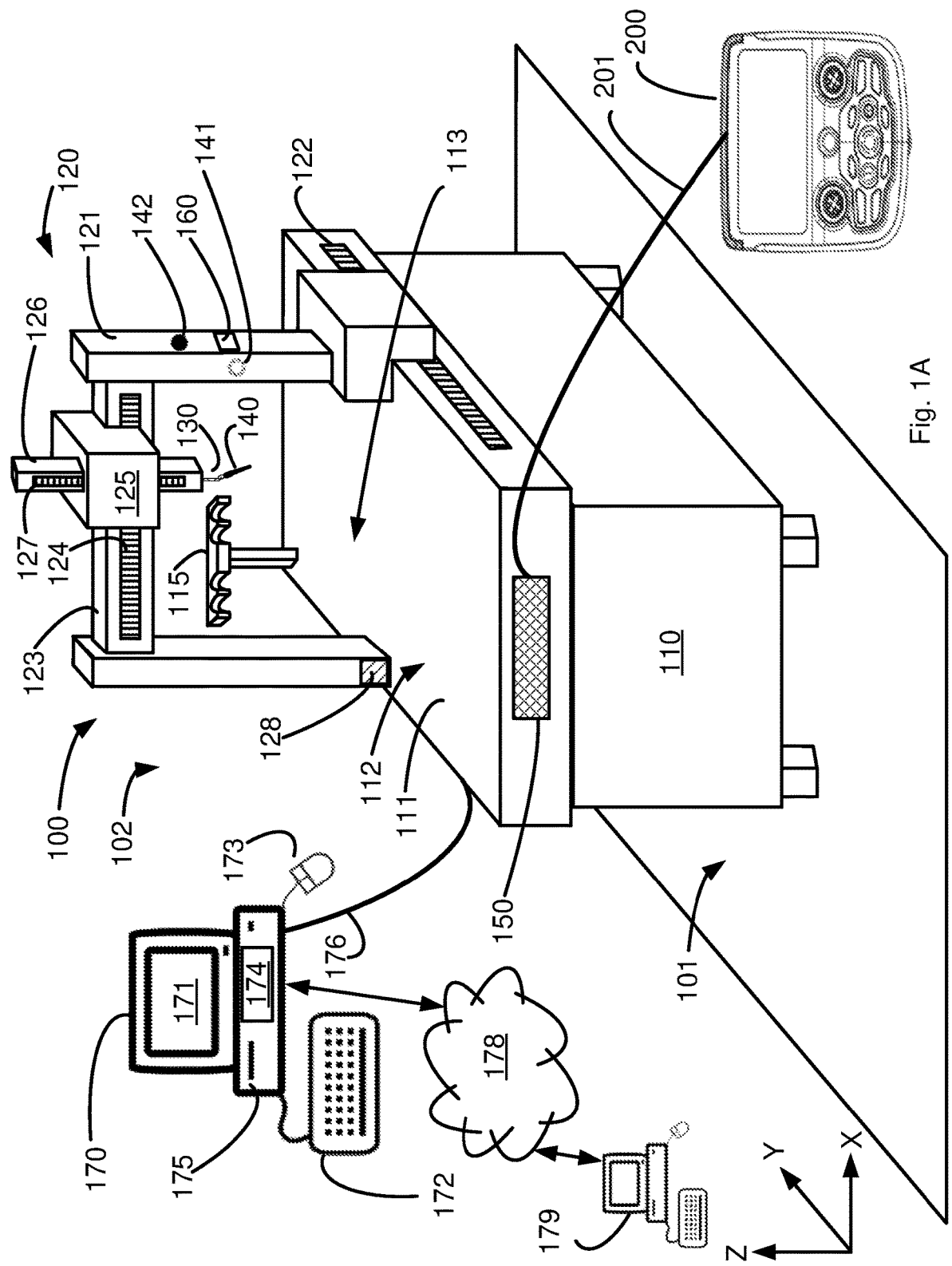
FIG. 1A schematically illustrates an embodiment of a coordinate measurement machine with an embodiment of a jogbox.
Figure 1E:
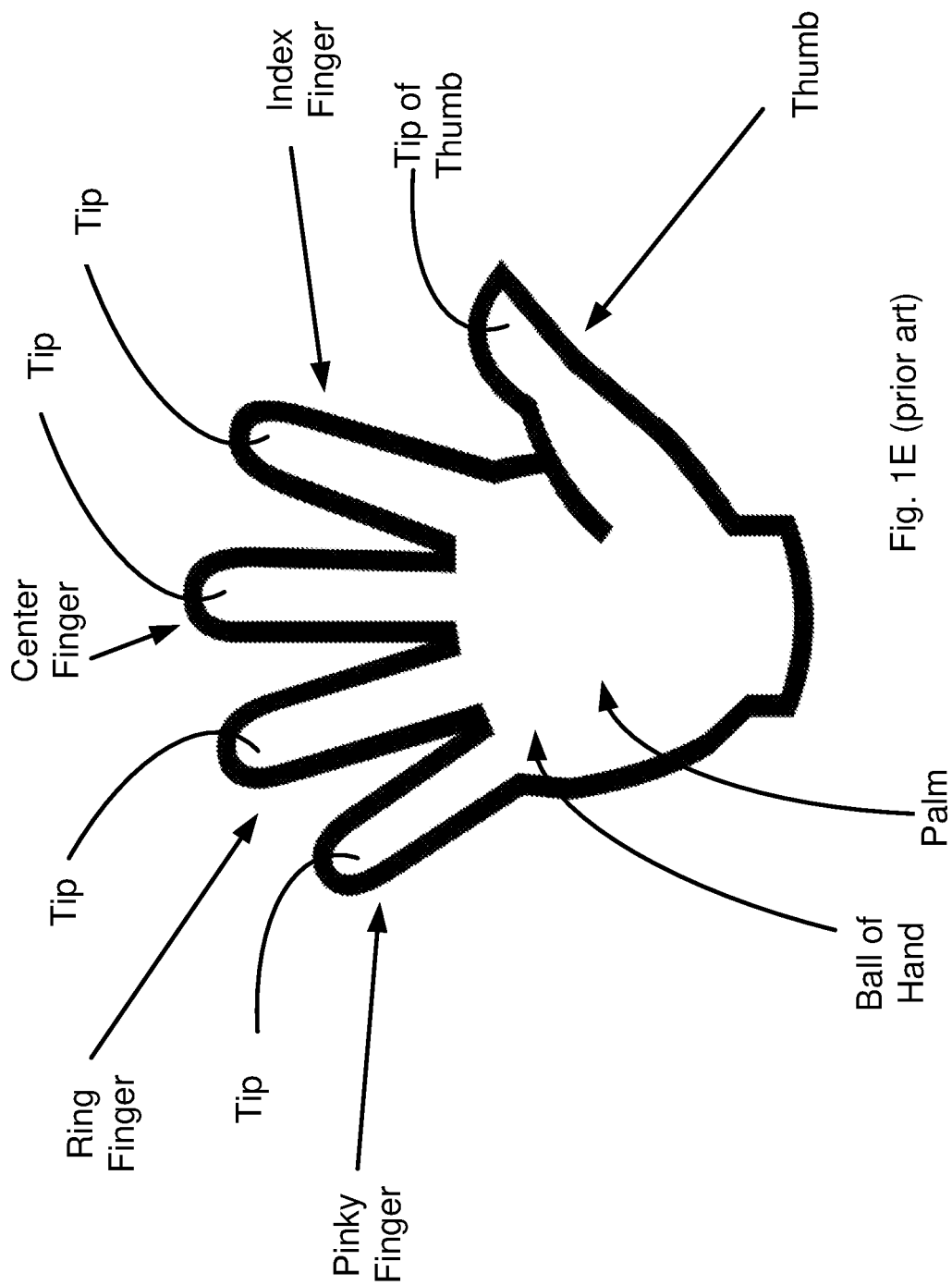
FIG. 1E schematically illustrates an embodiment of a human hand.
Figure 2A:
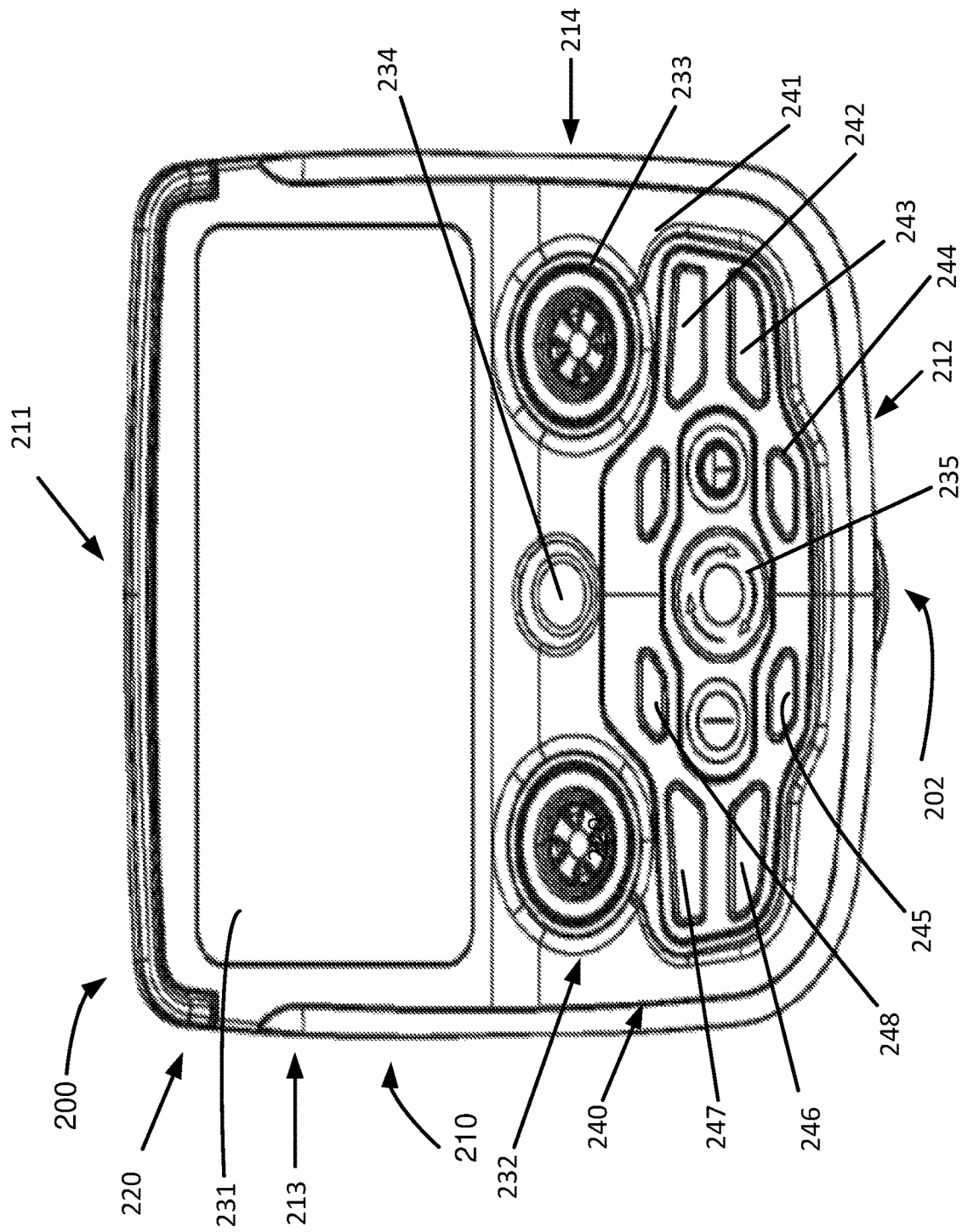
FIG. 2A, FIG. 2B, FIG. 2C, FIG. 2D, FIG. 2E, FIG. 2F, and FIG. 2G schematically illustrate views and features of an embodiment of a jogbox.
Figure 2B:
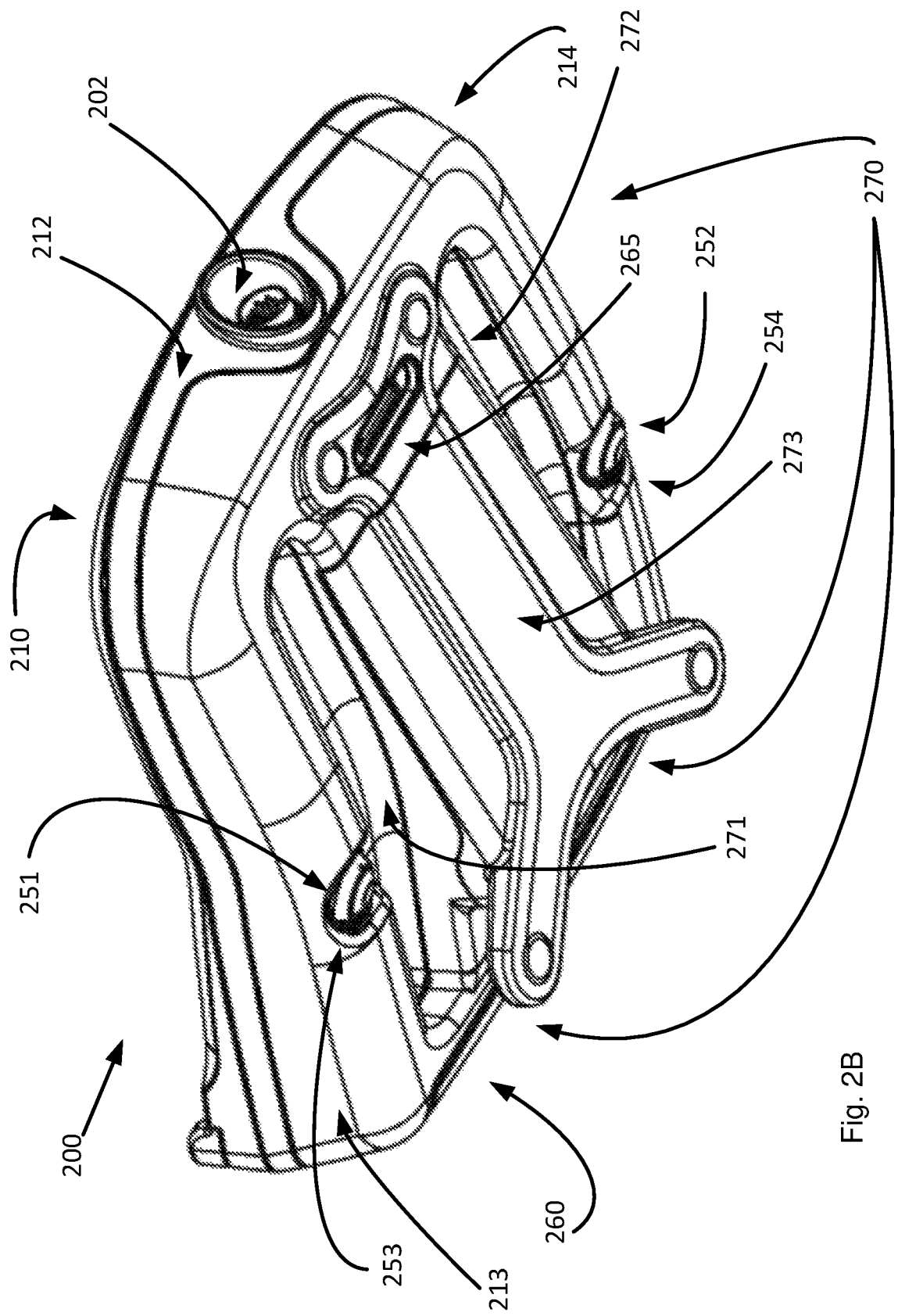
Figure 2C:
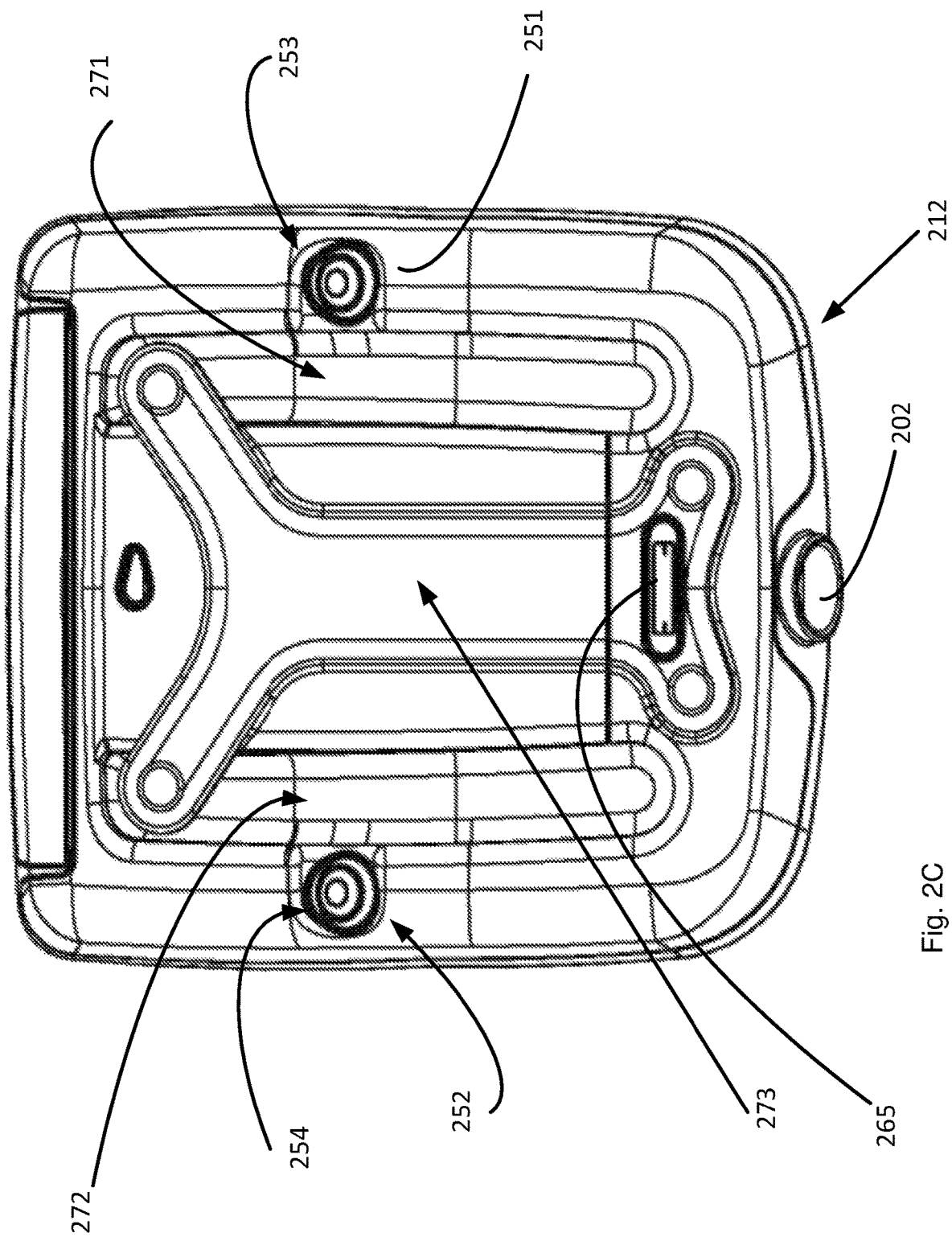
Figure 2D:
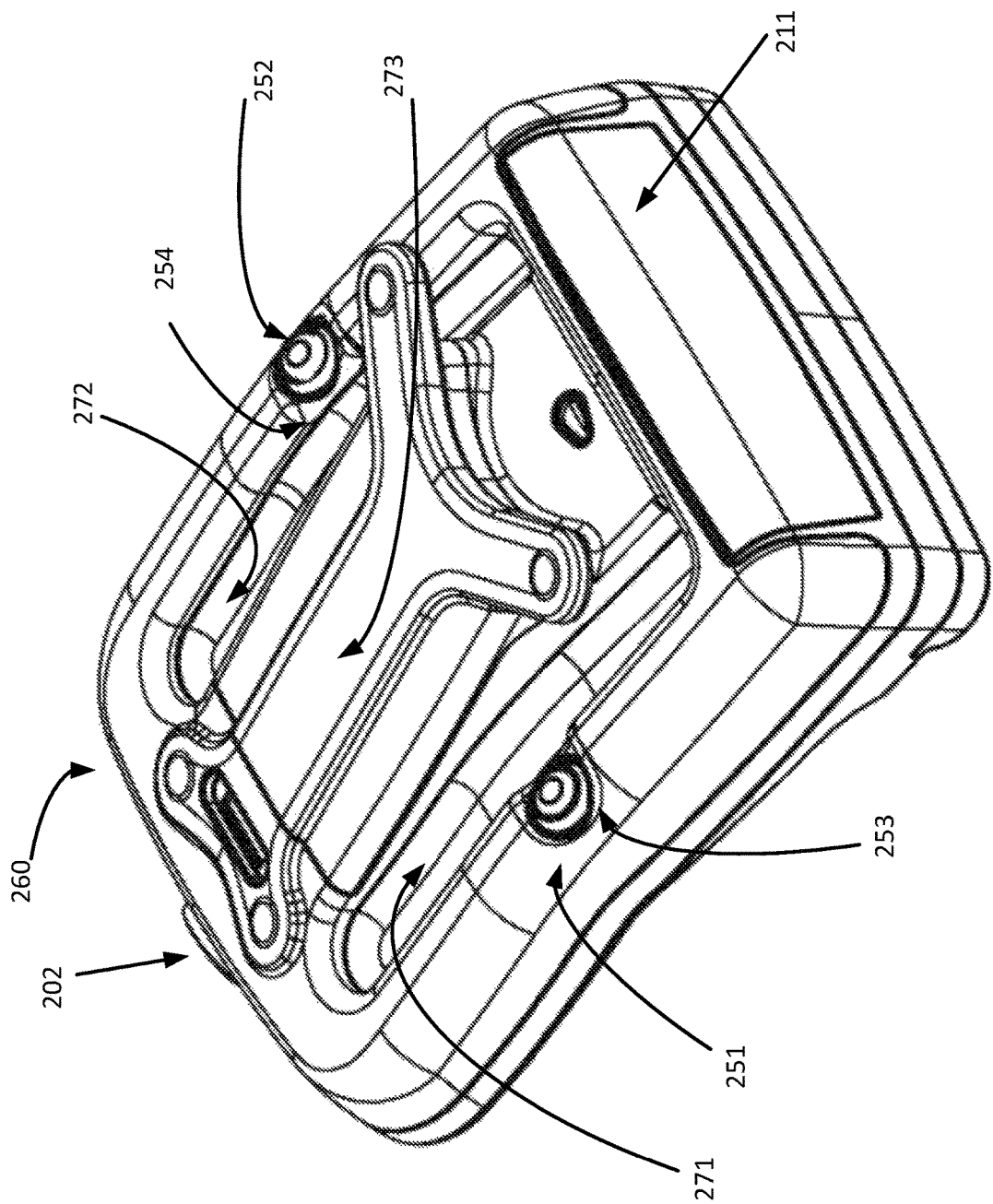
Figure 2E:
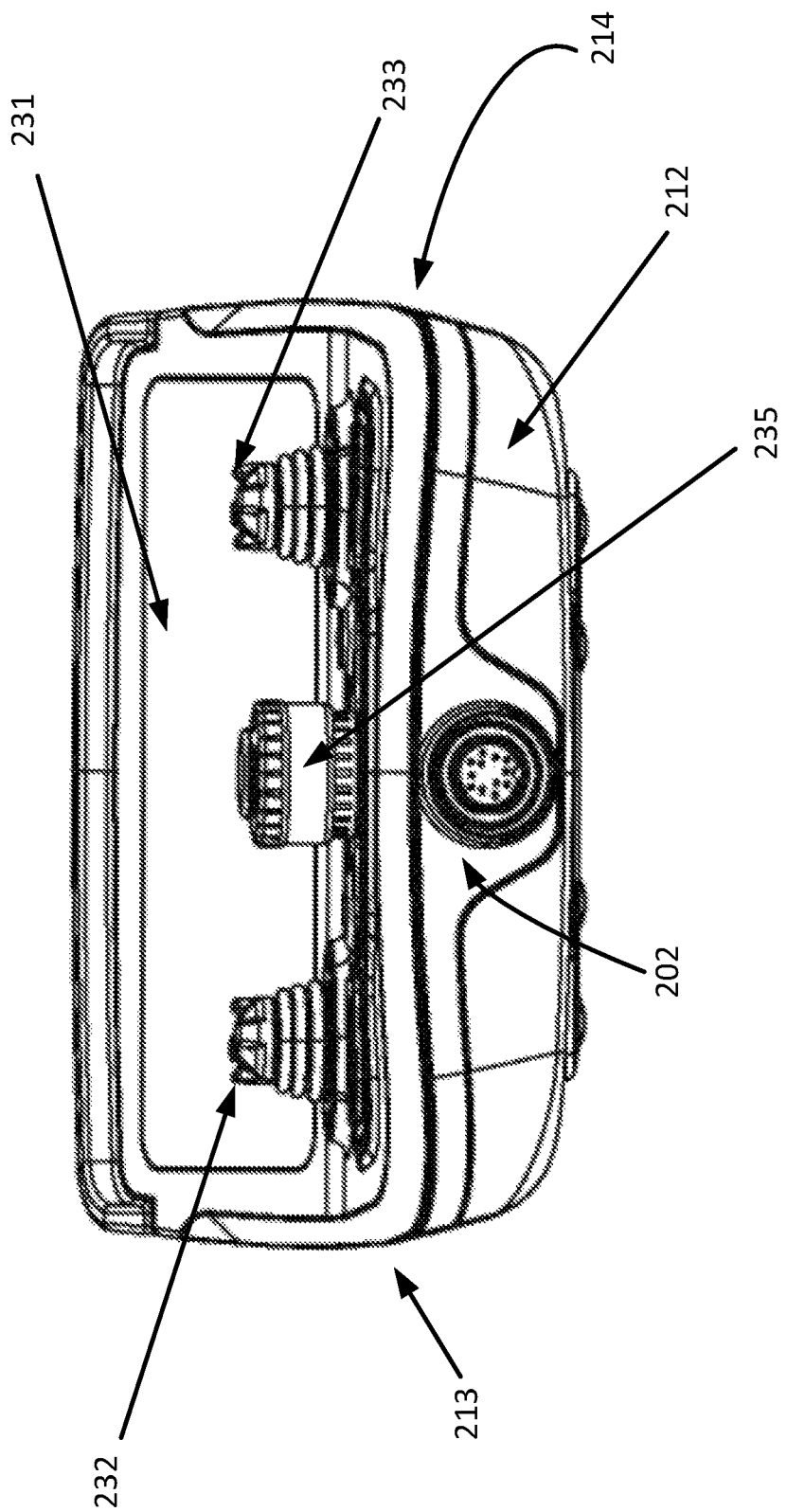
Figure 2F:
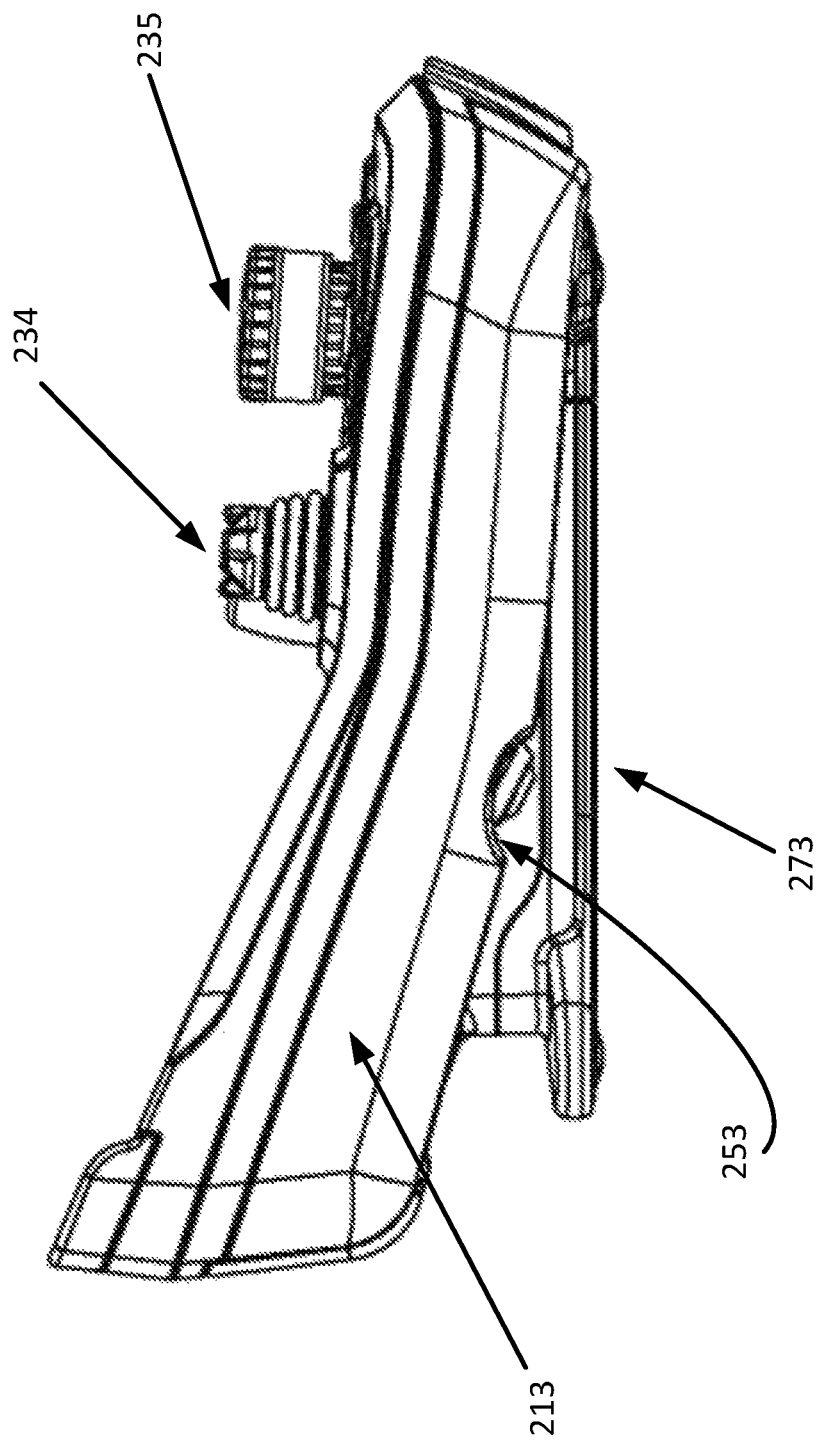
Figure 2G:
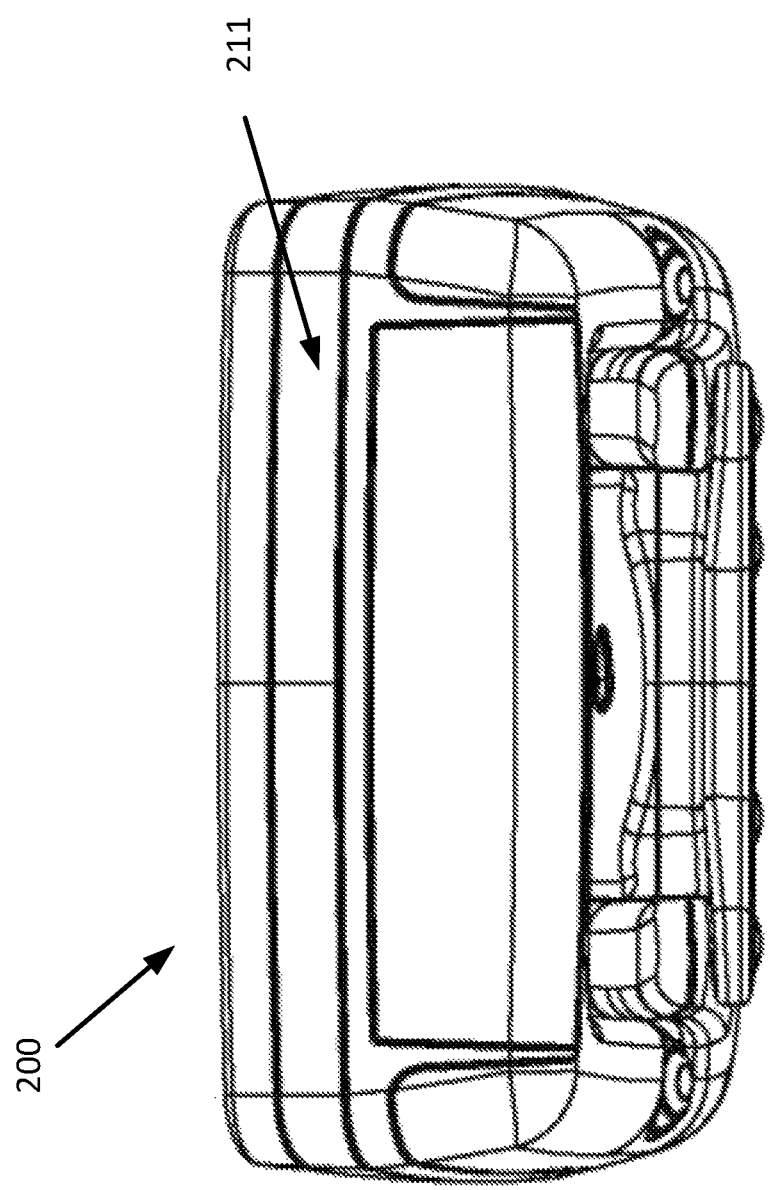

Embodiments described herein provide a mobile CMM controller that includes one or more ergonomic apparatuses configured and disposed to allow a CMM operator to hold and operate the jogbox, while avoiding or mitigating the fatigue of an operator using the jogbox.

Definitions. As used in this description and the accompanying claims, the following terms shall have the meanings indicated, unless the context otherwise requires:

The phrase "removably secured," with respect to two objects, means that a first object is secured to a second object such that the first object holds the second object in a fixed position, yet the second object is removable from the first object without damaging either object, and without having to remove a fastener or breaking an adhesive coupling.

A "set" includes at least one member.

FIGS. 1A-1D schematically illustrate a coordinate measurement machine 100 (hereinafter "CMM 100") that may be configured in accordance with illustrative embodiments.

As known by those in the art, a CMM is a system configured to measure one or more features of a work piece 180. An illustrative embodiment of a work piece 180 is schematically illustrated in FIG. 1B. Typically, a work piece 180 has a specified shape with specified dimensions, which may be referred-to collectively as the "geometry" 181 of the work piece 180. As an example, a work piece 180 may have an edge 182, and a corner 183. A work piece 180 may also have surfaces, such as a flat surface 184, and a curved surface 185. A meeting of two surfaces may create an inside angle 187. Moreover, each surface may have physical characteristic such as waviness 188 and/or surface finish 189, as known in the art. A work piece 180 may also have a cavity 186, which may also be an aperture through the work piece 180. As known in the art, a cavity 186 may have dimensions such as width and depth, which may in turn define an aspect ratio of the cavity 186.

CMM Base

In the illustrative embodiment of FIG. 1A, the CMM 100 includes a base 110 having a table 111. The table 111 of the CMM 100 defines an X-Y plane 112 that typically is parallel to the plane of the floor 101, and a Z-axis normal to the X-Y plane, and a corresponding X-Z plane and Y-Z plane. The table 111 also defines a boundary of a measuring space 113 above the table 111. In some embodiments, the CMM 100 includes a probe rack 115 configured to hold one or more measuring sensors 140. A moveable part of the CMM 100 may move to the probe rack 115 and place a measuring sensor 140 into the probe rack 115, and/or remove another measuring sensor 140 from the probe rack 115.

Moveable Parts

The CMM 100 also has movable features (collectively, 120) arranged to move and orient a measuring sensor 140 (and in some embodiments, a plurality of such devices) relative to the work piece 180. As described below, movable features of the CMM 100 are configured to move and orient the measuring sensor 140, relative to the work piece 180, in one dimension (X-axis; Y-axis; or Z-axis), two dimensions (X-Y plane; X-Z plane; or Y-Z plane), or three dimensions (a volume defined by the X-axis, Y-axis, and Z-axis). Accordingly, the CMM 100 is configured to measure the location of one or more features of the work piece 180.

The CMM 100 of FIG. 1A is known as a "bridge" CMM. Movable features 120 of the bridge CMM 100 include a bridge 123 movably coupled to the base 110 by legs 121. The bridge 123 and legs 121 are controllably movable relative to the base 110 along the Y-axis.

To facilitate motion of the legs relative to the base 110, the legs 121 may be coupled to the base 110 by one or bearings 128. As known in the art, a bearing may be a roller bearing or an air bearing, to name but a few examples.

The movable features also include a carriage 125 movably coupled to the bridge 123. The carriage is configured to controllably move in the X-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the Z-axis. The position in the Z-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a work piece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The moveable joint 131 allows the orientation of the measuring sensor 140 to be controllably adjusted relative to the arm 130, to provide to the measuring sensor 140 additional degrees of freedom in the X-axis, Y-axis, and/or Z-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the X-Y plane. In such embodiments, the CMM 100 moves the work piece 180 relative to the measuring sensor.

In other embodiments, which may be generally referred-to as "horizontal arm" CMMs, the bridge 123 is movably coupled to the base 110 to extend in the Z-axis, and to be controllably movable along the Y-axis. In such a CMM, the arm 130 is controllably extendable in the X-axis, and controllably movable up and down the bridge 123 in the Z-axis.

In yet other embodiments, the arm 130 is articulated. One end of the arm 130 is fixed to the base 110, and a distal end of the arm 130 is movable relative to the base 110 in one, two or three dimensions relative to a work piece 180 in the measuring space 113.

Sensors

In some embodiments, the measuring sensor 140 may be a tactile probe (configured to detect the location of a point on the work piece 180 by contacting a probe tip to the work piece 180, as known in the art), a non-contact probe (configured to detect the location of a point on the work piece 180 without physically contacting the work piece 180), such as a capacitive probe or an inductive probe as known in the art, or an optical probe (configured to optically detect the location of a point on the work piece 180), to name but a few examples.

In some embodiments, the measuring sensor 140 is a vision sensor that "sees" the work piece 180. Such a vision sensor may be a camera capable of focusing on the work piece 180, or the measurement area 113, and configured to capture and record still images or video images. Such images, and/or pixels within such images, may be analyzed to locate the work piece 180; determine the placement and/or orientation of the work piece 180; identify the work piece 180; and/or measure the work piece 180, to name but a few examples.

Some embodiments of a CMM 100 may include one, or more than one, camera 141 configured such that the measurement envelope 113 is within the field of view of the camera 141. Such a camera 141 may be in addition to a measuring sensor 140. The camera 141 may be a digital camera configured to capture still images and/or video images of the measurement envelope 113, a work piece 180 on the CMM 141, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the atmosphere around the CMM 102. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

In operation, the CMM 100 measures the work piece 180 by moving the measuring sensor 140 relative to the work piece 180 to measure the work piece 180.

Control System

Some embodiments of a CMM 100 include a control system 150 (or "controller" or "control logic") configured to control the CMM 100, and process data acquired by the CMM. FIG. 1C schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, non-transient digital memory (e.g., RAM or ROM) for storing data and/or computer code, including non-transient instructions for implementing some or all of the control system operations and methods. Alternately, or in addition, the computer processor 157 may be operably coupled to other non-transient digital memory, such as RAM or ROM, or a programmable non-transient memory circuit for storing such computer code and/or control data. Consequently, some or all of the functions of the controller 150 may be implemented in software configured to execute on the computer processor.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140 or camera 141. The sensor input 155 is configured to receive electronic signals from sensors, and in some embodiments to digitize such signals, using a digital to analog ("D/A") converter. The sensor input 155 is coupled to other modules of the control system 150 to provide to such other modules the (digitized) signals received from sensors.

The motion controller 153 is configured to cause motion of one or more of the movable features 120 of the CMM 100. For example, under control of the computer processor 157, the motion controller 153 may send electrical control signals to one or more motors within the CMM 100 to cause movable features 120 of the CMM 100 to move a measuring sensor 140 to various points within the measuring space 113 and take measurements of the work piece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a work piece 180 to be measured; a specification for a calibration artifact; an error map; and non-transient instructions executable on the computer processor 157, to name but a few examples. Such instructions may include, among other things, instructions for controlling the moveable features of the CMM 100 for measuring a work piece 180 and/or a calibration artifact; instructions for analyzing measurement data; and instructions for correcting measurement data (e.g., with an error map).

The measurement analyzer 154 is configured to process measurement data received from one or more sensors, such as measuring sensor 140. In some embodiments, the measurement analyzer 154 may revise the measurement data, for example by modifying the measurement data using an error map, and/or compare the measurement data to a specification, for example to assess deviation between a work piece 180 and a specification for that work piece 180. To that end, the measurement analyzer 154 may be a programmed digital signal processor integrated circuit, as known in the art.

Alternately, or in addition, some embodiments couple the CMM 100 with an external computer (or "host computer") 170. In a manner similar to the control system 150, the host computer 170 has a computer processor such as those described above, and non-transient computer memory 174, in communication with the processor of the CMM 100. The memory 174 is configured to hold non-transient computer instructions capable of being executed by the processor, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name but two examples.

Because their relative positions are determined by the action of the movable features of the CMM 100, the CMM 100 may be considered as having knowledge of the relative locations of the base 110, and the work piece 180. More particularly, the computer processor 157 and/or computer 170 control and store information about the motions of the movable features. Alternately, or in addition, the movable features of some embodiments include sensors that sense the locations of the table 111 and/or measuring sensor 140, and report that data to the computers 222 or 150. The information about the motion and positions of the table and/or measuring sensor 140 of the CMM 100 may be recorded in terms of a one-dimensional (e.g., X, Y Z), two-dimensional (e.g., X-Y; X-Z; Y-Z) or three-dimensional (X-Y-Z) coordinate system referenced to a point on the CMM 100.

Manual User Interface

Some CMMs also include a manual user interface 160. As shown, the manual user interface 160 may have controls (e.g., buttons; knobs, etc.) that allow a user to manually operate the CMM 100. Among other things, the interface 160 may include controls that enable the user to change the position of the measuring sensor 140 relative to the work piece 180. For example, a user can move the measuring sensor 140 in the X-axis using controls 161, in the Y-axis using controls 162, and/or in the Z-axis using controls 163.

If the measuring sensor 140 is a vision sensor, or if the CMM 141 includes a camera 141, then the user can manually move the sensor 140, camera 141, or change field of view of the vision sensor and/or camera using controls 165. The user may also focus the vision sensor and/or camera 141 using control 166 (which may be a turnable knob in some embodiments) and capture and image, or control recording of video, using control 167.

As such, the movable features may respond to manual control, or be under control of the computer processor 157, to move the base 110 and/or the measuring sensor 140 relative to one another. Accordingly, this arrangement permits the object being measured to be presented to the measuring sensor 140 from a variety of angles, and in a variety of positions.

Mobile Controller

FIG. 2A, FIG. 2B, FIG. 2C, FIG. 2D, FIG. 2E, FIG. 2F, and FIG. 2G schematically illustrate views and features of an embodiment of a mobile controller which may be referred-to as a jogbox (or "pendant") 200.

The jogbox 200 is not affixed to the coordinate measuring machine 100 in that its location is movable relative to the coordinate measuring machine 100. The mobility of the jogbox 200 allows an operator of the coordinate measuring machine 100 to move relative to the coordinate measuring machine 100, and relative to a work piece 180 on which the coordinate measuring machine 100 operates. Such mobility may allow the operator to move away from the coordinate measuring machine 100 for safety reasons, or to get a broader view of the coordinate measuring machine 100 or the work piece 180. The mobility of the jogbox 200 also allows the operator to move closer to the coordinate measuring machine 100 and the work piece 180 on which it operates than would be possible using a fixed control console or computer 170, in order, for example, to examine or adjust the location or orientation of the work piece 180, or the operation of the coordinate measuring machine 100.

To that end, the jogbox 200 is in data communication with the control system 150, and may be movably coupled to the control system 150 by a tether 201. In some embodiments, the jogbox 200 is in data communication with the communications interface 152 of the control system 150 via a tether 201 (which may be an Ethernet cable, a USB cable, or a Firewire cable, to name but a few examples), as schematically illustrated in FIG. 1A, and in other embodiments the jogbox 200 is in data communication with the communications interface 152 of the control system 150 via a wireless communications link, such as a Bluetooth connection, etc.

The jogbox 200 includes a number of features that facilitate an operator's control of the coordinate measuring machine 100. For example, the embodiment of FIG. 2A includes a housing 210 having a top side 211, a bottom side 212, a left side 213, a right side 214. The housing 210 also has a front face 220 that faces an operator controlling the coordinate measuring machine 100, and a back face 260 opposite the front face 220. The sides 211-214, front base 220 and back face 260 define an interior 219 of the jogbox, which interior may include circuitry that enables to jogbox to display information on its display screen 231 and respond to operator input from controls 230.

Some embodiments of the jogbox 200 include a display screen 231 configured to display, to a CMM operator, information about the operation of the coordinate measuring machine 100.

Some embodiments of the jogbox 200 have one or more controls 230 on the front face 220. For example, in the embodiment of FIG. 2A, the display screen 231 is a touch screen configured to receive user input (e.g., tactile user input such as a screen taps; swipe, etc.). The controls 230 of the embodiment of FIG. 2A also include a left joystick 232; a right joystick 233, a turnable knob (or roller ball) 234, a turnable wheel 235, and several buttons 241-248 (collectively 240).

Each of the controls 230 may be configured to receive input from an operator, and respond by causing an associated action. For example, turning knob 234 or wheel 235 may cause the display screen 231 to change the graphic displayed thereon, or may cause the jogbox 200 to cause a movable feature 120 of the coordinate measuring machine 100 to move.

In some embodiments, at least some of the controls 230 are reachable by an operator's thumb, when the operator holds the left side 213 and right side 214 of the jogbox 200 with the operator's left and right hands, respectively. In some embodiments, however, at least one of the controls 230 is unreachable by an operator's thumb when held in that way. For example, the turnable knob 234 may be disposed such that the reach of the thumb of an operator of ordinary human size is insufficient to operate the turnable knob 234.

In some embodiments, a control 230 that causes a movable feature 120 of the coordinate measuring machine 100 to move may be enabled only when another control, such as a backside control 250, is activated. For example, in some embodiments the backside control 250 is a set of one or more buttons (251 and/or 252). In such embodiments, a control 230 that causes a movable feature 120 of the coordinate measuring machine 100 to move may do so (e.g., be enabled) only when the backside control 250 (e.g. button 251 and/or 252) is pressed or held down. In other words, in some embodiments, the backside control 250 is configured, in a first position or first state, to enable the operator control of a movable feature 120 of the coordinate measuring machine 100 using a jogbox control 230 and, is configured, in a second position or second state, to disable operator control of that movable feature 120 of the coordinate measuring machine 100 using a jogbox control 230.

Relative to prior art devices, such as the apparatus of U.S. Pat. No. 8,581,855, the jogbox 200 is larger, owing for example to the display screen 231, and its number and arrangement of controls 230.

The jogbox 200 may also benefit from being more rugged or robust than prior art devices. For example, a game controller such as an X-Box controller is constructed to withstand life in a typical carpeted family room. In contrast, the jogbox 200 is constructed to survive an industrial environment, where it may be handled roughly, and be subject to impact with hard surfaces such as a concrete floor and/or portions of a coordinate measuring machine 100. For example, some embodiments of the jogbox 200 are configured to survive several drops from 6 feet, and submersion in water for 30 seconds.

To that end, the inventors found that the housing 210 may benefit from structural support, such as internal ribbing within the housing 210. Such ribbing makes the housing 210 stiffer than it would be otherwise.

On the other hand, its size and rugged, robust construction, tends to make the jogbox 200 bulkier and heavier than it would otherwise have been, and heavier and bulkier than prior art controllers. Such bulk and weight may make the jogbox 200 more difficult for an operator to hold and use. Moreover, such bulk and weight may increase the operator's fatigue the longer the jogbox 200 is held, particularly when the operator holds the jogbox 200 with one hand, for example to free a second hand to manipulate controls 230.

Consequently, illustrative embodiments of the jogbox 200 include one or more ergonomic apparatuses 270 extending from the back face 260 of the housing 210. The ergonomic apparatuses 270 are configured and disposed to allow an operator to hold and operate the jogbox 200, while avoiding or mitigating the fatigue of an operator using the jogbox 200.

One embodiment of an ergonomic apparatus 270 is a gripper 273 extending outward from the back face 260, the gripper 273 shaped and disposed to allow the CMM operator to grasp the gripper 273 and support the jogbox 200 with a single hand, so as to allow the CMM operator to manipulate at least one of the front side controls 230 with another hand. For example, in some embodiments the gripper 273 may be described as having a "T" shape, a "Y" shape, or the shape of a bone, or wishbone.

In some embodiments, the gripper 273 is also a cover for a battery compartment 205 disposed inside the housing 210. In illustrative embodiments, the gripper 273 is shaped and disposed to matably couple to a receiver (or nest) on another apparatus (e.g., a cradle, charging stand or holding stand), so as to be removably secured to the cradle when the gripper is mated with the receiver. In some embodiments, the gripper may also include electrical conduits (e.g., power port 265) to transmit electrical power from a charging stand (or cradle) to a battery in a battery compartment.

Another embodiment of an ergonomic apparatus 270 is a set of at least one concave trench 271 (and/or 272), extending inward from the surface of the back face 260. The concave trench 271 is shaped to receive one or more of an operator's fingers, and preferably three outer fingers of a hand of the operator (pinky finger, ring finger, and center finger), and to allow the CMM operator to grasp the jogbox 200 and support the jogbox 200 with a single hand, so as to allow the operator to manipulate at least one of the front side controls 230 with another hand. In preferred embodiments, the concave trench 271 is disposed near an edge 215 of the jogbox 200, so as to facilitate the ability of the operator to place the operator's fingers into the concave trench 271, and to facilitate the reception by the concave trench 271 of fingers of the operator.

Preferred embodiments include a set of two such concave trenches 271, 272, each disposed near a respective edge 215, 216. This enables the operator to grasp the jogbox 200 and support the jogbox 200 with either a left or a right hand, to enable the operator to manipulate at least one of the front side controls 230 with the other hand. The concave trenches 271 and 272 in some embodiments are parallel to one another.

In some embodiments, one or more concave trench 271, and/or 272, is configured so that the jogbox 200 is held between (secured by) the finger tips and the ball of the operator's hand (the ball of the operator's hand being that portion of the palm from which the fingers depart from the palm; generally, the area between the distal palmer crease and the palmer digital crease), rather than being held between the fingers and the center of the palm. This is a departure from prior art controllers that are held (configured to be held) between surface of fingers and center of the palm of a player's hand. For example, a standard X-Box controller as known in the art has two bulbous projections, each configured to be held between the surface of fingers and the center of the palm of a player's hand.

In this way, for example, the concave trench 271 or set of concave trenches 271 and 272 are configured to reduce or at least mitigate fatigue of the operator's hand, since the operator's palm is not working to grip the controller; and/or to allow greater flexibility for motion of and/or reach of the operator's thumb, since the palm need not be held against the controller and therefore can move/arch over the edge to the top face 220 of the jogbox 200.

Illustrative embodiments include one or more backside buttons. For example, the embodiment of FIG. 2C includes a first backside button 251 and a second backside button 252. The backside buttons 251 and 252 are preferably disposed near the right and left edge of the backside 260 of the jogbox 200.

In preferred embodiments, each backside button 251 and 252 is disposed between a trench (271 and 272, respectively) and the nearest side (215 and 216 respectively) of the jogbox 200. In such a configuration, an operator can lift a finger (e.g., a forefinger, an index finger, a middle finger) out of a trench and, by curling that finder towards the user's palm, can bring the finger to the button (271 or 272) and press or otherwise active that button. Moreover, in some embodiments the jogbox 200 includes a recess (253, 254) corresponding to each button (251, 252 respectively), and each such button is disposed within the recess (253, 254, respectively). When so disposed, each recess 253, 254 prevents, or at least reduces the chance of, the operator inadvertently pressing or otherwise activating a button 251, 252 with another part (e.g., the palm) of the operator's hand.

FIG. 3A, FIG. 3B, FIG. 3C, FIG. 3D, FIG. 3E, FIG. 3F, FIG. 3G and FIG. 3H schematically illustrate another embodiment of a jogbox 200.

FIG. 3D schematically illustrates a side view of a jogbox 200, and FIG. 3F and FIG. 3G schematically illustrate a cross-section of the jogbox 200 along line A-A. FIG. 3F schematically illustrates the cross-section of trenches 271 and 272, and also shows the location of backside buttons 251 and 252 disposed outward of the trenches 271 and 272, receptively, so that each backside button 251 and 252 is disposed between a trench (271, 272) and an edge (215, 216, respectively) formed at the intersection of a the bottom surface 260 of the jogbox 200 and a side (213, 214 respectively) of the jogbox 200.

Figure 3A:
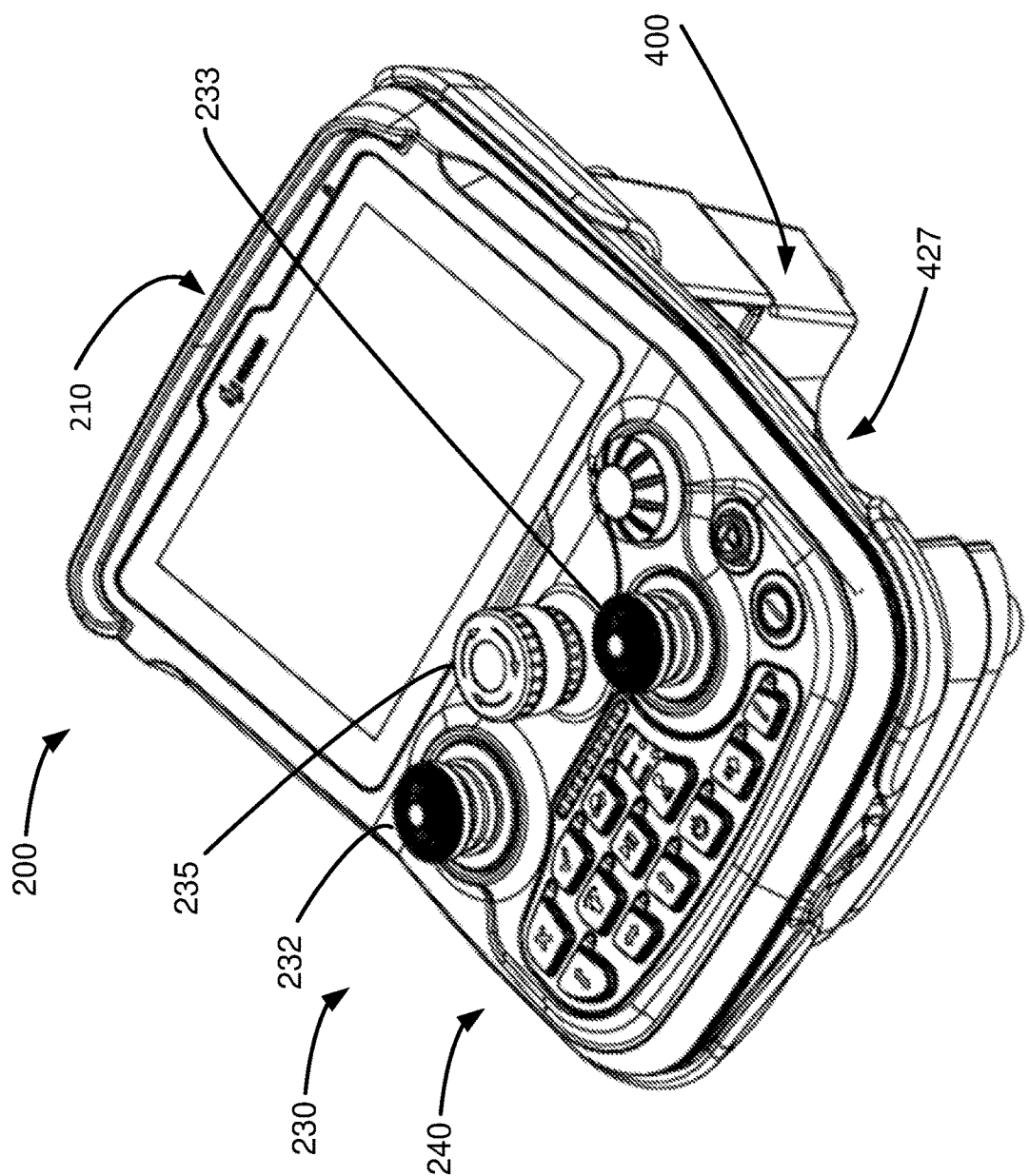
Figure 3E:
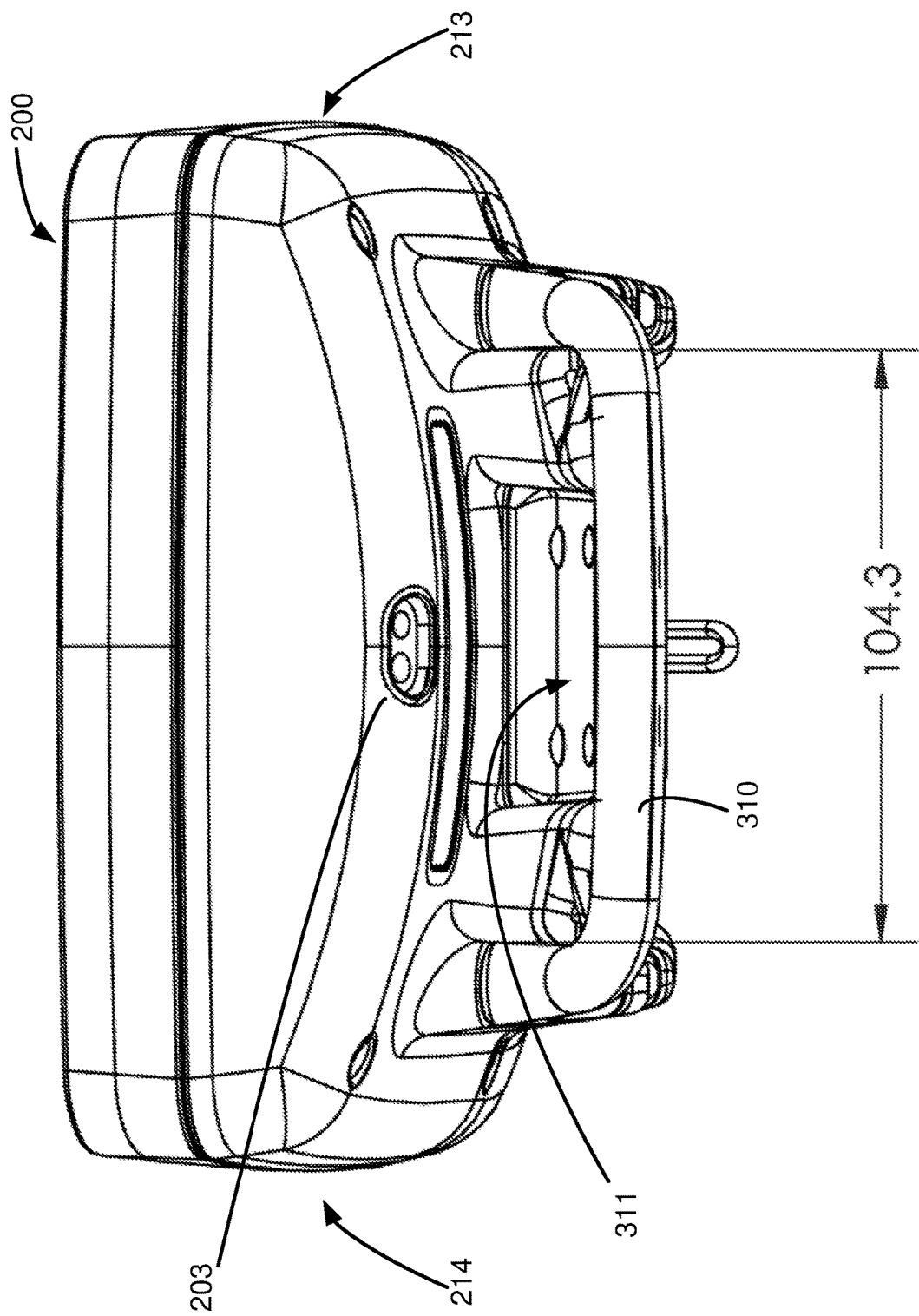
Figure 3H:
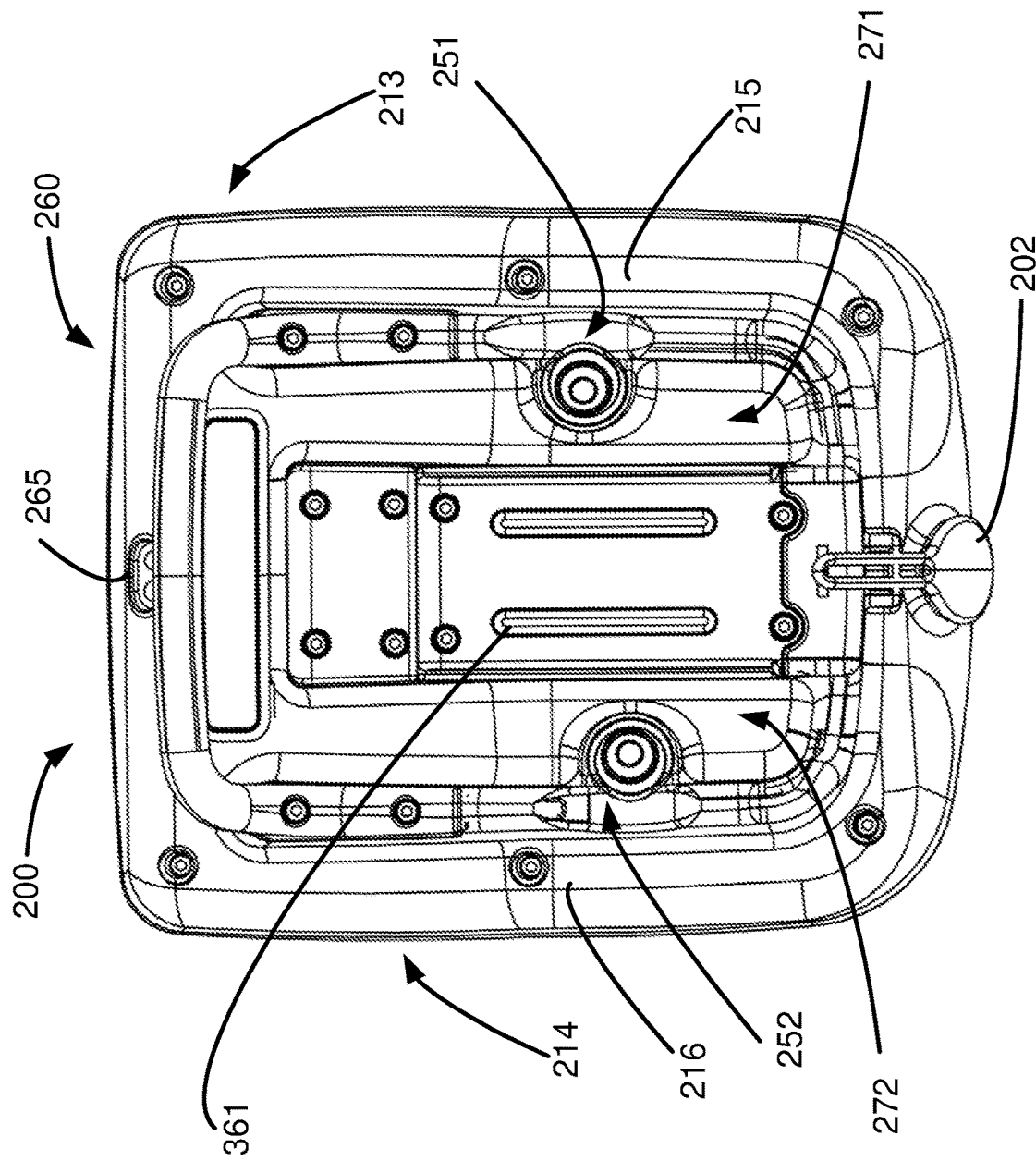

FIG. 3D and FIG. 3E also schematically illustrate a handle 310 extending from the back face 260 of the jogbox 200. The handle 310 provides a convenient structure allowing an operator to hold and carry the jogbox 200, for example, when the jogbox 200 is not in use. The location of the handle 310 on near the back side 211 of the jogbox 210 allows an operator to hold the handle 310 even when a tether 201 is coupled to a port 202 on the front side 212 of the jogbox. In some embodiments, the handle 310 extends so that it is parallel to the back face 260 of the jogbox 200, to provide extra stability to the jogbox 200 when the jogbox 200 is resting on a flat surface. In the embodiment of FIG. 3D, the handle 310 defines an aperture 311 having a width of 26.4 mm, so allow entry of a hand of an operator. In the embodiment of FIG. 3E, the handle has a length of 104.3 mm.

To facilitate holding the jogbox 200, by one or both hands of an operator, the jogbox 200 has a thickness from the back face 260 to the top face 220, the thickness equal to about the size of the palm of an average adult human, such that the operator's fingers can extend into a trench (271, 272) while at the same time the operator's thumb can reach at least some of the controls 230 on the top face 220 of the jogbox 200, and the operator's palm extends along the side 213 of the controller. For example, as schematically illustrated in FIG. 3F, the thickness of the jogbox 200, from the bottom 260 to the top face 220 is 58.0 mm. For those same reasons, the trench 271 is offset, as measured from the side 213 of the jogbox 200, so as to allow the operator's palm and/or fingers to wrap around the edge 215 of the jogbox 200, while allowing the operator's fingers to extend into the trench 271 to grasp and hold the jogbox 200.

In this embodiment, each trench 271, 272 defines an outer side surface 277, and inner side surface 279, and a top surface 279. The side surfaces 277, 278 define a trench width, which this embodiment is 27.6 mm. The top surface 279 defines a trench depth, which in this embodiment is 19.0 mm at its deepest point.

As schematically illustrated in FIG. 3G, in illustrative embodiments the top surface 279 is curved, such that the depth of the trench is deeper towards the nearest side of the jogbox 200. In other words, as the top surface 279 extends away from the side 213 of the jogbox 200, the top surface curves towards the bottom 260 of the jogbox 200. In such a configuration, the top surface curves to meet the surface of the operator's finger or fingers, to facilitate support of the jogbox 200 by the operator's finger(s).

Cradle

FIG. 4A, FIG. 4B, FIG. 4C, FIG. 4D, FIG. 4E and FIG. 4F schematically illustrates a cradle 400 configured to hold a jogbox 200. FIG. 4B schematically illustrates a front view of the cradle 400, FIG. 4C schematically illustrates a right side view of the cradle 400, FIG. 4D schematically illustrates a back view of the cradle 400, FIG. 4E schematically illustrates a top view of the cradle 400, and FIG. 4F schematically illustrates a bottom view of the cradle 400. FIG. 3A and FIG. 3C each schematically illustrates a jogbox 200 supported on and/or coupled a cradle 400. The embodiment of FIG. 2A, in some embodiments, may also be supported by and/or coupled to a cradle 400.

The cradle 400 has a base 410 configured to rest flat on a surface, such as a tabletop for example.

The cradle 400 also has a nest 430 (or "receiver") configured to receive a jogbox 200. In illustrative embodiments, the nest 430 is configured to receive a jogbox 200 and removably couple the jogbox 200 to the cradle 400. To those ends, illustrative embodiments of a nest 430 have a shape that is complementary to the shape of a jogbox 200, such that the jogbox 200 mates to the nest 430, and the cradle 400 thereby supports and holds the jogbox 200. In preferred embodiments, the shape and dimension of the nest 430 are selected so that the jogbox 200, or portion of the jogbox 200, press-fits or snap-fits into the nest 430 such that the nest 430 securely, but removably, holds the jogbox 200. In such embodiments, the nest 430 may be described as configured to removably secure a jogbox 200 to the cradle 400.

A set of one or more sidewalls (or "legs") 421-424 extend between the base 410 and the nest 430, to hold the nest 430, and any attached jogbox 200, at a fixed distance from the base 430.

The embodiment of FIG. 4A includes four sidewalls 421-424, each of which supports a corresponding socket 431-434. Each socket 431-434 has a concave shape that is complementary to a corresponding feature of a jogbox 200. Collectively, the sockets 431-434 define the nest 430.

Sidewall 421 and sidewall 423 define a left grasping aperture (or "left grasping gap") 426 between them, and sidewall 422 and sidewall 424 likewise define a right grasping aperture (or "right grasping gap") 427 between them. Each grasping aperture 426, 427 is configured (e.g., sized and positioned) to receive a hand of an operator to allow the operator's fingers to reach a back face 260 of a jogbox 200 in the nest, and to release and lift the jogbox 200 out of the nest 430. In illustrative embodiments, each grasping aperture 426, 427 is configured (e.g., sized and positioned) to allow the hand of the operator to reach and activate a backside button (551, 552) of a jogbox 200 while the jogbox 200 is secured in the nest 430.

Sidewall 423 and sidewall 424 define top aperture 428 between them. The top aperture 428 is configured (e.g., sized and disposed) to allow a cable to reach and couple to a secondary port 203 (e.g., a power port or communication port) on a jogbox 200 when the jogbox 200 is secured in the nest 430.

Sidewall 421 and sidewall 422 define bottom aperture 429 between them. The bottom aperture 429 is configured (e.g., sized and disposed) to allow a cable (e.g., 201) to reach and couple to a tether port 202 on a jogbox 200 when the jogbox 200 is secured in the nest 430.

In some embodiments, the distance between the base 410 and the nest 430 is such that a cradle output interface makes power and/or communications contact with a counterpart interface on a jogbox 200, when a jogbox 200 is disposed in a nest 430. In this way, power and/or communication from the cradle 400 is provided to the jogbox 200 to allow the jogbox 200 to be operable and/or charged while in the cradle 400.

Cradle Input Interface

Some embodiments of the cradle 400 include an input interface 450 configured to receive a power signal and/or communication signals, for providing the same to a jogbox 200 on the cradle 400. For example, one embodiment of an input interface 450 includes a power connector 451 configured to receive a power cable, which power cable delivers electrical power to the power connector 451. Another embodiment of an input interface 450 includes a communication connector 452 configured to receive a communication cable such as cable 201 (FIG. 1A), which communication cable provides communicating signals to and/or carries communication signals from, the cradle 400. Some embodiments of an input interface include both a power connector 451 and a communication connector 452. In some embodiments of an input interface 450, a single connector is configured as both a power connector 451 and a communication connector 452.

Cradle Output Interface

Some embodiments of the cradle 400 include an output interface 460 configured to provide a power signal and/or communication signals to a jogbox 200 on the cradle 400 (e.g., a jogbox 200 secured in a nest 430). In illustrative embodiments, the output interface 460 is in electrical communication with the input interface 450, to transfer power and/or communication signals from the input interface 450 to the output interface 460, and ultimately to a jogbox 200 in the nest 430.

To those ends, illustrative embodiments of an output interface 460 include a power interface 465 configured to interface to a power port 265 on a jogbox 200, and disposed on the cradle 400 so that the power interface 465 couples to such a power port 265 when the jogbox 200 is disposed in the nest 430.

Illustrative embodiments of an output interface 460 also include a communications interface 461 configured and disposed to communicate with a counterpart communication port 361 on a jogbox 200, when the jogbox 200 is disposed in the nest 430.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A coordinate measuring machine mobile controller (or "jogbox") comprising: a housing having a front side and a backside and an interior, the front side comprising a plurality of control actuators; control electronics disposed within the interior housing, the control electronics responsive to human operator manipulation of the control actuators to produce control signals to control motion of movable features of the coordinate measuring machine; a communications interface configured to communicate the control signals to the coordinate measuring machine; and a physical user interface on the backside of the housing, the physical user interface forming at least two concave trenches extending into the interior from of the backside, the trenches disposed to allow fingers of the operator to hold the controller with a single hand while manipulating the actuators with another of the operator's second hands.

P2. The coordinate measuring machine mobile controller of P1, wherein the trenches are disposed to allow fingers of the user to hold the controller in a user-facing position such that the controller is disposed to allow fingers of the user to hold the controller with a single hand while manipulating the actuators with a second hand.

P3. The coordinate measuring machine mobile controller of any of P1-P2, wherein the actuators are selected from a category comprising knobs, buttons, and icons on a touch screen.

P4. The coordinate measuring machine mobile controller of any of P1-P3, further comprising a grip on the backside, the grip configured to secure the controller to a charging station.

The following is a list of reference numbers used herein:
100: Coordinate measuring machine;
101: Floor;
102: Environment;
110: Base;
111: Table;
112: Plane;
113: Measurement envelope;
115: Probe rack;
120: Moveable features;
121: Bridge legs;
122: Table scale;
123: Bridge;
124: Bridge scale;
125: Carriage;
126: Spindle;
127: Spindle scale;
128: Bearing;
130: Arm;
131: Moveable joint;
132: Rotary encoder;
140: Measuring sensor;
141: Camera;
142: Environmental sensor;
150: Control system;
151: Bus;
152: Communications interface;
153: Motion Controller;
154: Measurement analyzer;
155: Sensor input;
156: Memory;
157: Computer processor;
160: User interface;
161: X-axis controls;

162: Y-axis controls;
163: Z-axis controls;
165: Camera motion controls;
166: Camera focus control;
167: Camera record control;
170: Host computer;
171: Screen;
172: Keyboard;
173: Mouse;
174: Computer memory;
175: Memory interface/communications port;
176: Communication link;
178: Network;
179: Server;
180: Work piece;
181: Geometry;
182: Edge;
183: Corner;
184: Flat surface;
185: Curved surface;
186: Cavity;
187: Inside angle;
188: Waviness;
189: Surface finish;
200: Jogbox;
201: Tether;
202: Tether port;
203: Power port or communication port;
205: Battery compartment;
210: Housing;
211: Top of housing;
212: Bottom of housing;
213: Left side of housing;
214: Right side of housing;
215: Left bottom edge of housing;
216: Right bottom edge of housing;
219: Interior of jogbox;
220: Front face of housing;
230: Controls, generally;
231: Display screen;
232: Left joystick;
233: Right joystick;
234: Knob;
235: Wheel;
240: Buttons, generally;
241: Button 1;
242: Button 2;
243: Button 3;
244: Button 4;
245: Button 5;
246: Button 6;
247: Button 7;
248: Button 8;
250: Safety interface;
251: First backside button;
252: Second backside button;
253: First button recess;
254: Second button recess;
260: Back face of housing;
265: Power port;
270: Ergonomic apparatuses;
271: Left finger support trench;
272: Right finger support trench;
273: Gripper;
310: Jogbox handle;
311: Handle aperture;
361: Jogbox communication port;
400: Cradle;
410: Cradle base;
421-424: Cradle sidewalls;
426: Left grasping aperture;
427: Right grasping aperture;
428: Top cradle aperture;
429: Bottom cradle aperture;
426: Left aperture;
430: Nest;
431-434: Nest sockets;
450: Cradle input interface;
451: Cradle power input connector;
452: Cradle communication connector;
461: Cradle communication interface;
465: Cradle power interface;

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:
1. A cradle comprising:
a base configured to rest on a flat surface;
a nest suspended from the base, the nest configured to receive a jogbox and removably couple the jogbox to the cradle; and a set of grasping apertures, each grasping aperture configured to receive a hand of an operator to allow fingers to reach a backface of a jogbox in the nest and to lift the jogbox out of the nest.

2. The cradle of claim 1, further comprising:

a set of sidewalls extending between the base and the cradle, the set of sidewalls suspending the cradle from the base.

3. The cradle of claim 1, wherein at least one grasping aperture of the set of grasping apertures is configured to allow the hand of the operator to reach and activate a backside button of a jogbox while the jogbox is secured in the nest.

4. The cradle of claim 1 further comprising an input electrical interface configured to receive electrical power and communication signals.

5. The cradle of claim 4 further comprising an output electrical interface configured to provide electrical power and communication signals to a jogbox secured in the nest.

* * * * *